United States Patent
Burchard

(10) Patent No.: US 11,605,143 B2
(45) Date of Patent: Mar. 14, 2023

(54) BLOCKCHAIN WITH JOINT CLAIMS ON TOKENS

(71) Applicant: Goldman Sachs & Co. LLC, New York, NY (US)

(72) Inventor: Paul Burchard, Jersey City, NJ (US)

(73) Assignee: GOLDMAN SACHS & CO. LLC, New York, NY (US)

( * ) Notice: Subject to any disclaimer, the term of this patent is extended or adjusted under 35 U.S.C. 154(b) by 0 days.

(21) Appl. No.: 17/745,343

(22) Filed: May 16, 2022

(65) Prior Publication Data

US 2022/0366405 A1 Nov. 17, 2022

Related U.S. Application Data

(60) Provisional application No. 63/263,805, filed on Nov. 9, 2021, provisional application No. 63/188,770, filed on May 14, 2021.

(51) Int. Cl.
| | |
|---|---|
| *G06Q 40/00* | (2012.01) |
| *G06Q 50/18* | (2012.01) |
| *G06Q 20/36* | (2012.01) |
| *G06Q 10/10* | (2023.01) |
| *H04L 9/00* | (2022.01) |

(52) U.S. Cl.
CPC .......... *G06Q 50/182* (2013.01); *G06Q 10/10* (2013.01); *G06Q 20/3678* (2013.01); *H04L 9/50* (2022.05); *G06Q 40/00* (2013.01)

(58) Field of Classification Search
CPC .. G06Q 50/182; G06Q 10/10; G06Q 20/3678; G06Q 40/00; H04L 9/50
See application file for complete search history.

(56) References Cited

U.S. PATENT DOCUMENTS

| | | | | |
|---|---|---|---|---|
| 2004/0199470 A1* | 10/2004 | Ferry, Jr. | ................ | G06Q 20/40 705/16 |
| 2014/0046818 A1* | 2/2014 | Chung | ................... | G06Q 40/00 705/35 |

(Continued)

FOREIGN PATENT DOCUMENTS

| | | | | |
|---|---|---|---|---|
| WO | WO-2017090041 A1 * | 6/2017 | ......... | G06F 21/6245 |
| WO | 2019226489 A1 | 11/2019 | | |

OTHER PUBLICATIONS

Mauro Conti, Sandeep Kumar, Chhagan Lal, and Sushmita Ruj, A Survey on Security and Privacy Issues of Bitcoin, Dec. 25, 2017, IEEE, web, p. 1-10 (Year: 2017).*

(Continued)

*Primary Examiner* — I Jung Liu
(74) *Attorney, Agent, or Firm* — Fenwick & West LLP

(57) ABSTRACT

A smart contract including one or more rules is defined and stored on a blockchain in conjunction with a pool of one or more tokens owned by the smart contract. A plurality of conflicting claims to the pool of one or more tokens is received and provided to the blockchain. An indication that a trigger condition is met is received from the blockchain. The trigger condition to determined using the one or more rules. Information indicating a distribution of the one or more tokens to resolve the plurality of conflicting claims is also received. The information is generated using the one or more rules in response to the trigger condition being met.

20 Claims, 3 Drawing Sheets

(56) References Cited

U.S. PATENT DOCUMENTS

| | | | |
|---|---|---|---|
| 2015/0287026 A1* | 10/2015 | Yang | G06Q 20/065 705/69 |
| 2018/0096360 A1 | 4/2018 | Christidis | |
| 2018/0182052 A1 | 6/2018 | Panagos | |
| 2019/0089717 A1* | 3/2019 | Dolev | G06F 21/31 |
| 2020/0258148 A1 | 8/2020 | Hummer | |
| 2020/0327609 A1 | 10/2020 | Dubrofsky | |

OTHER PUBLICATIONS

Braun, A. et al. "A Token Design for Decentralized Insurance on the Blockchain." Wharton University of Pennsylvania, Risk Management and Decision Processes Center, Mar. 6, 2020, 2 pages, [Online] [Retrieved May 24, 2022], Retrieved from the Internet <URL:https://riskcenter.wharton.upenn.edu/labs/atokendesignforde centralizedinsuranceontheblockchain/>.

Leshner, R. et al. "Compound: The Monday Market Protocol." Whitepaper, Version 1.0, Feb. 2019, pp. 1-8.

Murray, T. et al. "Tokenized Risk Protocol." BranBridge, Whitepaper, Nov. 8, 2021, 22 pages, [Online] [Retrieved May 24, 2022], Retrieved from the Internet <URL:https://github.com/BarnBridge/BamBridge-Whitepaper>.

Mussenbrock, C. "Token Mechanics for a Decentralized Insurance Platform." Etherise, Version 1.0, Jun. 19, 2017, pp. 1-12.

Opium Team. "Opium Protocol Whitepaper." Opium-Contracts, v0.9, Sep. 1, 2020, pp. 1-18, [Online] [Retrieved May 24, 2022], Retrieved from the Internet <URL:https://github.com/OpiumProtocol/opium-contracts/blob/master/docs/opium_whitepaper.pdf>.

Saffron. "Saffron.finance." App., Version 2, Mar. 2021, 2 pages, [Online] [Retrieved Oct. 4, 2022], Retrieved from the Internet <URL:https://app.saffron.finance/#docs>.

Timeswap. "Introduction." Timeswap.gitbook.io, Jan. 2021, 3 pages, [Online] [Retrieved May 24, 2022], Retrieved from the Internet <URL:https://timeswap.gitbook.io/timeswap/>.

PCT International Search Report and Written Opinion, PCT Application No. PCT/IB2022/054545, dated Aug. 29, 2022, 6 pages.

* cited by examiner

BLOCKCHAIN WITH JOINT CLAIMS ON TOKENS

CROSS-REFERENCE TO RELATED APPLICATIONS

This application claims the benefit of U.S. Provisional Application No. 63/188,770, filed May 14, 2021, and 63/263,805, filed Nov. 9, 2021, which are incorporated by reference.

TECHNICAL FIELD

The disclosure relates generally to the field of blockchains, and in particular to providing joint claims on tokens.

BACKGROUND

Distributed ledgers (e.g., blockchains) were developed as a means for parties to engage in transactions, e.g., financial transactions, without the need for a single, trusted intermediary. In such systems, each transaction is recorded independently by several nodes. In some implementations, no one entity controls all of the nodes so it is exceedingly difficult for a malicious actor to alter the transaction once it has been recorded by the nodes. Even in implementations where a single entity controls all of the nodes, it is still exceedingly difficult to alter the data recorded on sufficient nodes to change the consensus indicated by all of the nodes without leaving an indication that the data has been tampered with.

At a high level, a cryptocurrency functions by defining tokens for which transfers of ownership are stored on a blockchain. Thus, whether someone purporting to hold a token is the true owner of the token can be established by inspecting the transaction history stored on the blockchain. However, while fractional ownership is possible for existing cryptocurrency implementations, this is achieved by dividing up a token into portions that are owned by different entities. In other words, there is a one-to-one correspondence between a token (or portion of a token) and ownership. This technical limitation of existing approaches makes it impractical to use many powerful financial techniques that involve leverage with such cryptocurrencies.

SUMMARY

The above and other problems may be solved using smart contracts that allow for multiple, potentially conflicting claims on the same token. That is, leverage may be introduced into a cryptocurrency by enabling the total of the claims on tokens to exceed the actual tokens available. This may enable the cryptocurrency to be used in a wide range of financial applications, such as fractional reserve banking, insurance, bonds, securitized products, and margin loans. So long as there is a potential for the claimed assets to grow, it becomes possible for the conflicting claims to be resolved without any loss and potentially some gain. The simplest cases can be handled with joint claims settled proportionally to the stakes of claimants, but much more financial innovation is possible when non-proportional joint claims are used. Thus, the described approach enables cryptocurrencies to be used in ways that were previously not possible.

Aspects of the present disclosure include a computer-implemented method of providing joint claims to tokens. The method includes defining a smart contract including one or more rules; storing the smart contract on a blockchain in conjunction with a pool of one or more tokens owned by the smart contract; receiving a plurality of conflicting claims to the pool of one or more tokens; providing the plurality of conflicting claims to the blockchain; receiving, from the blockchain, an indication that a trigger condition is met, wherein the trigger condition being met was determined using the one or more rules; and receiving information, generated using a subset of the one or more rules, indicating a distribution of the one or more tokens to resolve the plurality of conflicting claims, wherein the information was generated responsive to the trigger condition being met.

In some embodiments, the subset of rules to resolve the plurality of conflicting claims is in a manner other than proportionally to stakes of claimants.

In some embodiments, the blockchain records, for each blockchain address, claims equal to total deposits of tokens made into the pool by that blockchain address.

In some embodiments, responsive to the trigger condition being met, the subset of the rules assigns: first, equal amounts of the one or more tokens up to a minimum of a first claim of the plurality of conflicting claims and a maximum deposit insurance amount, and second, a proportional amount of the one or more tokens to remaining claims of the plurality of conflicting claims.

In some embodiments, the plurality of conflicting claims comprise periodic interest payments stored in the blockchain. In some embodiments, one or more blockchain addresses borrow tokens for a limited time in exchange for interest payments deducted from another smart contract to provide for the periodic interest payments.

In some embodiments, a trigger condition is met when the plurality of conflicting claims to one or more tokens does not reach a threshold value above the actual value of the one or more tokens.

In some embodiments, the method further includes periodically transferring portions of the one or more tokens in the pool to a deposit insurance smart contract, wherein the subset of rules include using the portions of the one or more tokens transferred to the deposit insurance smart contract to at least partially mitigate a deficiency between a total value of pool and a total value of the plurality of conflicting claims.

In some embodiments, receiving the indication that the trigger condition is met comprises receiving an indication from an oracle that an off-chain loss event has occurred and the subset of rules resolve claims in favor of one or more users impacted by the off-chain loss event.

In some embodiments, the method further includes: periodically transferring portions of the one or more tokens in the pool to a reinsurance smart contract; and responsive to receiving the indication of the loss event, receiving a reinsurance payment from the reinsurance smart contact for losses over a threshold, wherein the subset of rules include that outstanding claims from the plurality of conflicting claims get a proportional amount of the pool after the reinsurance payment has been taken into account.

In some embodiments, the plurality of conflicting claims include claims for future interest payments and claims for future principal payments.

In some embodiments, the pool further includes an additional smart contract with joint claims.

In some embodiments, the plurality of conflicting claims have a hierarchy of higher priority claims and lower priority claims, wherein the subset of rules include that higher priority claims in the hierarchy are paid in full over lower priority claims.

In some embodiments, the pool further includes a second smart contract, the plurality of conflicting claims include a claim for a borrower and a claim for a lender, and the one or more rules include resolving, responsive to the borrower failing to make a scheduled payment within a specified time, the claim for the lender with priority over the claim for the borrower.

In some embodiments, the blockchain comprises a plurality of nodes, wherein each node receives a definition of the smart contract and transactions that impact the plurality of conflicting claims to pool of one or more tokens, and wherein each node maintains an independent record of the smart contract and plurality of conflicting claims of which it has been informed.

In some embodiments, the method further includes: receiving, from the blockchain and prior to the trigger condition being met, an indication that a second trigger condition is met, wherein the second trigger condition being met was determined using the one or more rules; resolving, in response to the second trigger condition having been met, a subset of the plurality of conflicting claims. In certain embodiments, the distribution of the one or more tokens to resolve the plurality of conflicting claims is subject to the resolution of the subset of the plurality of conflicting claims.

Aspects of the present disclosure include a non-transitory computer-readable medium storing instructions that, when executed by a processor, cause the processor to perform operations comprising: defining one or more rules for the smart contract; storing the smart contract on a blockchain in conjunction with a pool of one or more tokens owned by the smart contract; receiving a plurality of conflicting claims to the pool of one or more tokens; providing the plurality of conflicting claims to the blockchain; receiving, from the blockchain, an indication that a trigger condition is met, wherein the trigger condition being met was determined using the one or more rules; and receiving information, generated using a subset of the one or more rules, indicating a distribution of the one or more tokens to resolve the plurality of conflicting claims, wherein the information was generated responsive to the trigger condition being met.

Aspects of the present disclosure include a networked computing system suitable for providing smart contracts that use joint claims on tokens, the networked computing system including: a management device configured to: define and manage rules of smart contracts that use joint claims on tokens; process transactions and record a plurality of conflicting claims to a blockchain; store the smart contract on the blockchain in conjunction with a pool of one or more tokens owned by the smart contract; send information about each claim of the plurality of conflicting claims to a set of the plurality of nodes; and provide information to a client device to drive a user interface; the client device comprising a computing device configured to interact with the smart contract; and the smart contract comprising one or more rules for determining whether a trigger condition is met, wherein the management device is further configured execute a subset of the one or more rules to resolve the plurality of conflicting claims responsive to the trigger condition being met.

In some embodiments, the plurality of conflicting claims is resolved using the subset of rules in a manner other than proportionally to stakes of claimants.

In some embodiments, responsive to the trigger condition being met, the subset of the rules assigns: first, equal amounts of the one or more tokens up to a minimum of a first claim of the plurality of conflicting claims and a maximum deposit insurance amount, and second, a proportional amount of the one or more tokens to remaining claims of the plurality of conflicting claims.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Example Systems

Figure 1:
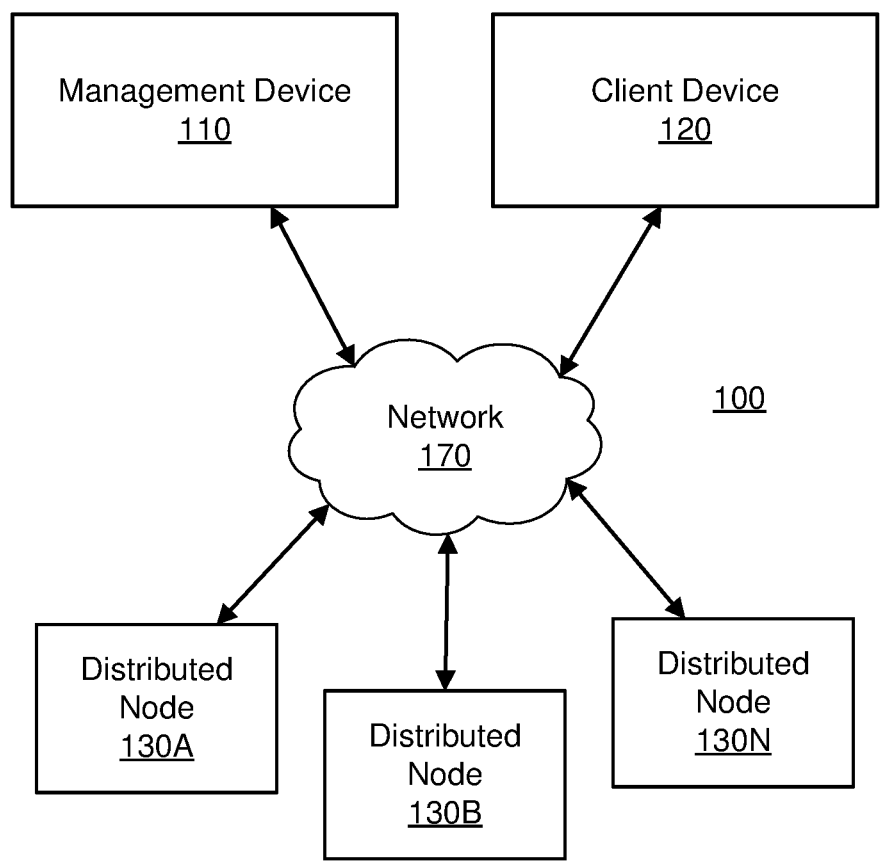
FIG. 1 illustrates a networked computing environment suitable for providing smart contracts that use joint claims on tokens, according to one embodiment.

FIG. 1 illustrates one embodiment of a networked computing environment 100 suitable for providing joint claims on tokens using smart contracts. In the embodiment shown, the network computing environment includes a management device 110, a client device 120, and a set of distributed nodes 130, all connected via a network 170. In other embodiments, the networked computing environment 100 includes different or additional elements. In addition, the functions may be distributed among the elements in a different manner than described.

The management device 110 is a computing device with which a user (e.g., an employee of the financial institution) may define and manage the rules of smart contracts. Although only one management device 110 is shown, in practice there may be any number of such devices used by any number of users. Furthermore, in some embodiments, more than one financial institution may use the same distributed nodes 130 to record smart contracts. Alternatively, a financial institution may define or operate its own set of distributed nodes 130.

The client device 120 is a computing device with which a user (e.g., a customer of the financial institution) may interact with the smart contract. In one embodiment, the management device 110 provides information to the client device 120 to drive a user interface (e.g., in an app or portal displayed via a web browser). Using the user interface, the user may initiate transactions that result in the creation, transfer, or deletion of a claim to a token or portion of a token. The term, "token" can refer to any form of digital currency, such as, but not limited to, cryptocurrency, an electronic coupon, an identifier of another tangible or intangible asset, or a virtual promissory note, etc. The management device 110 may process the transaction and record the claim to a blockchain by sending information about the claim to the set of distributed nodes 130. In contrast to a conventional cryptocurrency applications, the claim may conflict with one or more existing claims that are already recorded in the blockchain without replacing those existing claims. Alternatively, the client device 120 may submit information about the claim to the distributed nodes 130 directly.

In one embodiment, a blockchain is a transactional record that is maintained at each node of a networked computing environment suitable for providing smart contracts that use joint claims on tokens. For each blockchain address, claims equal to the total deposits of tokens made into the pool by that blockchain address may be recorded. The blockchain includes groupings of transactions bundled together into a "block". When a change to the blockchain is made (e.g., when a new transaction and/or block is created), the nodes form a consensus as to how the change is integrated into the network of distributed nodes 130. Upon consensus, the agreed upon change is pushed out to each distributed node 130 so that each node maintains a copy that should match the copies stored by other nodes. Any change that does not achieve a consensus may be ignored. Accordingly, unlike a traditional, centralized ledger, a single party cannot unilaterally alter the blockchain. In other embodiments, other types of distributed ledger may be used.

The smart contract includes a set of one or more rules for handling conflicting claims to one or more tokens (or portions of tokens). In various embodiments, the smart contract will initially record conflicting claims without taking further action. The rules of the smart contract include one or more conflict resolution rules that trigger when one or more criteria are met to resolve the conflicting claims. For example, in a fractional reserve banking embodiment, conflicting claims to one or more tokens may be allowed to reach a threshold value above the actual value of the one or more tokens (e.g., three, five, or ten times the value of the one or more tokens, etc.) and, if that condition is breached, then each of the conflicting claims is resolved by assigning non-conflicting ownership of a portion of the one or more tokens determined based on claim settlement rules. A claim is non-compliant, e.g., "conflicting," when a threshold value above the actual value of the one or more tokens is breached (e.g., thus a trigger condition being met).

In some embodiments, multiple trigger conditions may be used. When a first trigger condition is met, a first subset of claims are resolved, leaving a second subset of claims unresolved and active. When a second trigger condition is met, the second subset of claims is resolved. For example, if losses for an investment token pool exceed a first threshold, junior claims may be cut off without a payout, leaving senior claims to the pool active. If the losses pass a second threshold, more senior claims may also be cut off without a payout.

In one embodiment, claims may be settled by first assigning equal amounts to each claim up the minimum deposit insurance amount of the claim or the maximum deposit insurance amount, and, thereafter, proportionally to the remaining claims. In other words, the total settlement if the joint, conflicting claims is non-proportional to the stakes corresponding to the individual. When a subset of rules of the smart contract to resolve conflicting claims is in a manner that is "non-proportional" to stakes of claimants, the subset of rules assign an amount of one or more tokens up to a minimum deposit insurance amount of at least a first claim and a maximum deposit insurance amount of the at least first claim. Thereafter, the one or more tokens can be assigned an additional non-proportional amount to a second, third, fourth, nth, etc. claim, or a proportional amount of a deposit insurance to any remaining claims. Various example use cases are described in further detail below.

The distributed nodes 130 are computing devices that record the smart contracts and claims on tokens. The distributed nodes 130 may manage and provide a blockchain or other type of distributed ledger. The distributed nodes 130 can also store and execute the rules set by the smart contract. Thus, when a triggering condition of a smart contract is met, one or more operations may be automatically performed by the distributed nodes 130. In various embodiments, the distributed nodes 130 can operate outside of the management device 110. When an event or data relevant to a smart contract is generated, relevant information may be added to a block of the blockchain. In one embodiment, a record in the block can include a claimant ID, assets, insurance payments, and additional data elements associated with the claimant. When there are conflicting claims, this can impact the amount of tokens (or portions thereof) assigned to various parties (e.g., customers) associated with the smart contract. Thus, the blockchain and smart contract can codify and automatically enforce rules governing the resolution of conflicting claims to a pool of tokens where the sum of claims exceeds the value of the pool of tokens.

FIG. 1 shows three distributed nodes 130 (a first distributed node 130A, a second distributed node 130B, and an Nth distributed node 130N), but in practice there can (and likely will) be many more such nodes. In various embodiments, each distributed node 130 receives definitions of smart contracts and transactions that impact claims to tokens and maintains an independent record of the smart contracts and claims of which it has been informed.

When a distributed node 130 receives a request to verify a claim, (e.g., from the management device 110) it confirms or denies whether the claim is consistent with its records. A claim is considered successfully verified if a threshold amount of the distributed nodes 130 agree that the claim is consistent with their records. For example, a Byzantine fault tolerance approach may be used to determine whether sufficient nodes confirm the validity of a claim to verify the claim. Similarly, an action defined in a rule of a smart contract may be triggered if a threshold amount of the distributed nodes 130 agree that a triggering condition for the action has been met.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Example Use Cases

In an example banking configuration, claims of depositors may be recorded that equal the amount of tokens they have put into a smart contract plus interest on their claim amount. The rules for the smart contract include that depositors can attempt to withdraw at any time, and all withdrawals by depositors are fulfilled at face value unless the total tokens in the contract go below a specified fractional reserve of the total depositor claims. The rules further includes that, in the event of a breach of this condition, depositors are paid back out of the actual tokens in the contract first in equal amounts up to the minimum deposit insurance amount of their claim and the maximum deposit insurance amount, and thereafter a proportional amount of the one or more tokens to remaining claims. Such an example can include non-proportional amounts of the token can be for one or more claims, and a remaining proportional amount of the tokens to any remaining claims. In order to fund the interest payments, other borrowing parties may borrow tokens from the contract for a limited time with the payment of interest. The interest and principal payments may be designated to (e.g., deducted from) another "joint claims" smart contract. Optional deposit insurance can be implemented by a third "joint claims" smart contract that attempts to pay the deficiency for each depositor up to some limit in the event that the fractional reserve condition is breached in exchange for insurance premium payments out of the pool of tokens owned by the first smart contract.

In an example insurance configuration, customers pay regular insurance premiums into a smart contract which entitles them to certain contingent claims on the total pool of tokens. These claims need not be proportional to the customer's stake, i.e., how much premium they have paid. These claims are activated if an oracle on the blockchain confirms an off-chain loss event conforming to the insurance smart contract. Reinsurance can be implemented by a second "joint claims" smart contract which gets premium payments from the first smart contract and pays the first smart contract an amount of losses over a given threshold. The rules for resolving conflicting claims in the first contract include that outstanding claims get a proportional amount of the pool of tokens after reinsurance has been taken into account.

In an example configuration for providing securitized products, investors put in tokens to invest in certain tranches of a pool of investments and have claims recorded for a share of future interest payments and a future principal payment. The pooled investments may also include joint claims contracts such as bonds. The smart contract has detailed rules for a cashflow waterfall that takes claims secured from the pooled investments and applies rules to determine which investor claims will be satisfied. For example, the senior tranche investor claims may be satisfied first before the junior tranche investor claims.

In an example configuration that provides margin loans, the smart contract has two parties, the lender and borrower. The smart contract includes two types of assets, a currency and a second smart contract between the two parties. An oracle acts as a valuation agent to determine the current value of the second smart contract. The lender and borrower have joint claims over the holdings of the margin loan smart contract. The rules of the margin loan smart contract require the borrower to deposit currency equal to an initial margin amount plus the current value of the enclosed smart contract. If that deposit is not made within a specified time, a resolution protocol is initiated that resolves the claims to the holdings of the margin loan smart contract in favor of the lender.

Computing System Architecture

Figure 2:
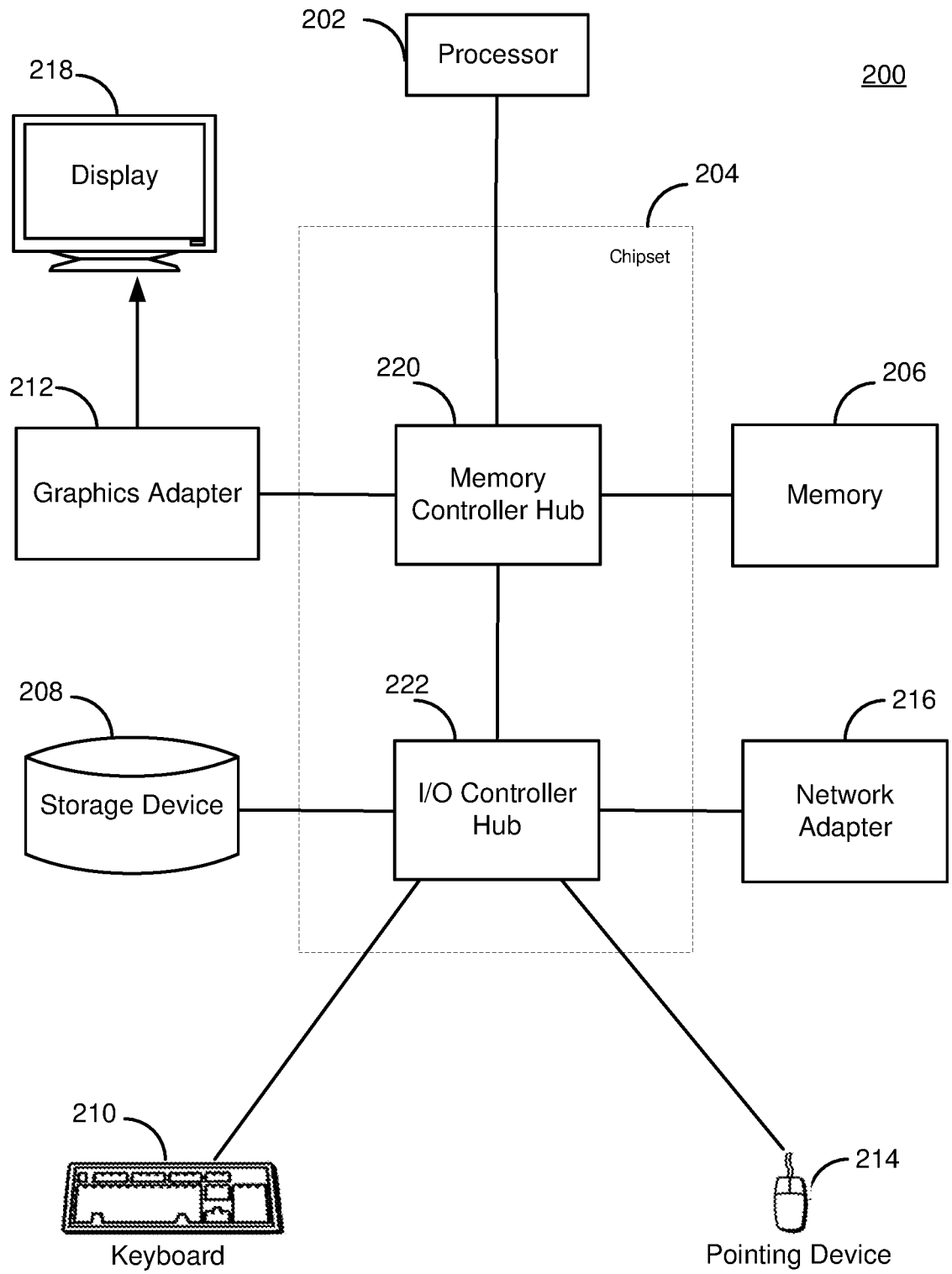
FIG. 2 is a block diagram illustrating an example of a computer suitable for use in the networked computing environment of FIG. 1, according to one embodiment.

FIG. 2 illustrates an example computer 200 suitable for use as a management device 110, client device 120, or distributed node 130, according to one embodiment. The example computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

In the embodiment shown in FIG. 2, the storage device 208 is a non-transitory computer-readable storage medium such as a hard drive, compact disk read-only memory (CD-ROM), DVD, or a solid-state memory device. The memory 206 holds instructions, e.g., to perform the methods described herein, and data used by the processor 202. The pointing device 214 is a mouse, track ball, touch-screen, or other type of pointing device, and is used in combination with the keyboard 210 (which may be an on-screen keyboard) to input data into the computer system 200. The graphics adapter 212 displays images and other information on the display 218. The network adapter 216 couples the computer system 200 to one or more computer networks (e.g., network 170). The types of computers used by the entities of FIG. 1 can vary depending upon the embodiment and the processing power required by the entity. Furthermore, the computers can lack some of the components described above, such as keyboards 210, graphics adapters 212, and displays 218.

Example Method

Figure 3:
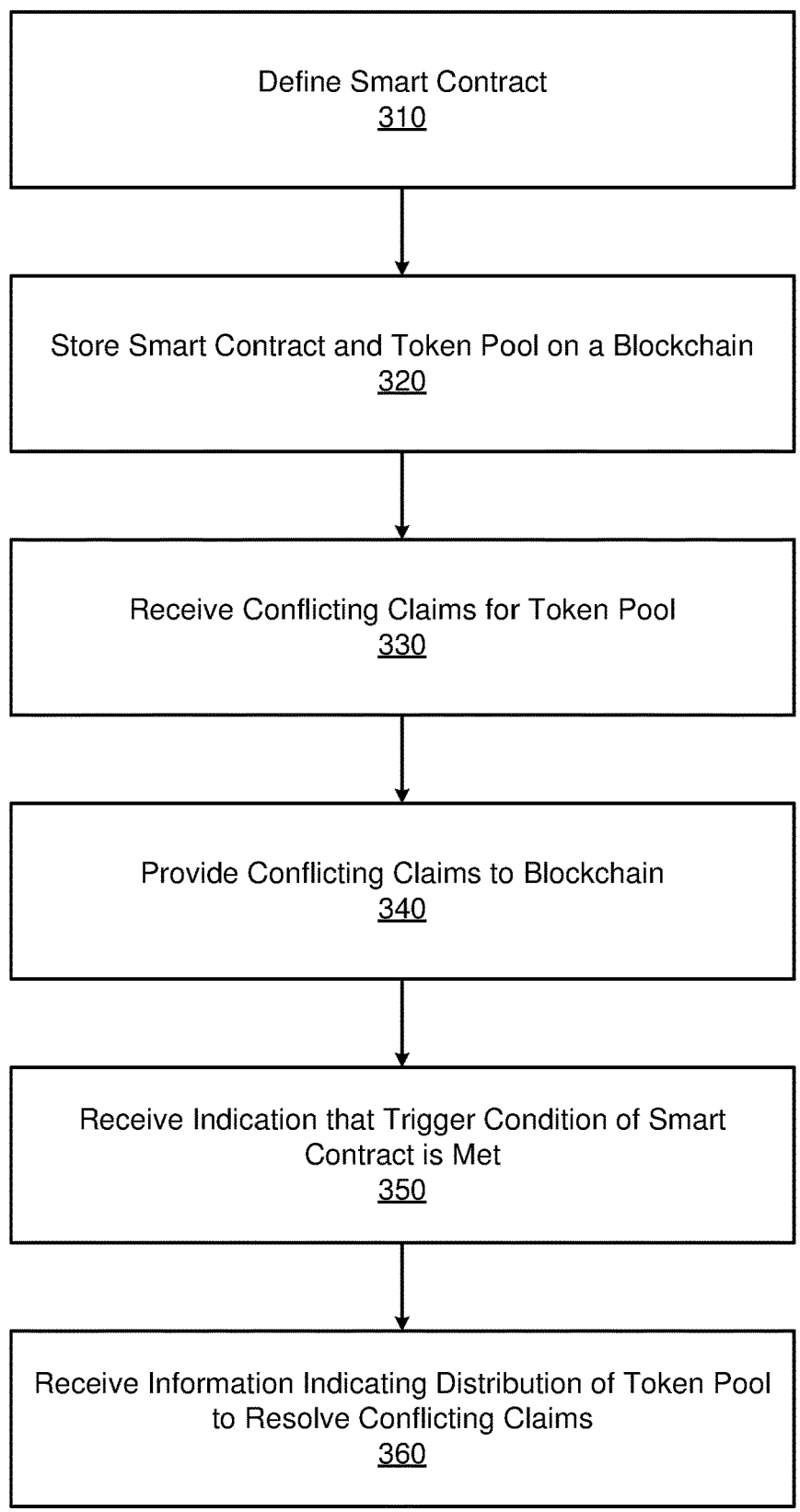
FIG. 3 is a flowchart of a method for processing joint claims on tokens using a smart contract, according to one embodiment.

FIG. 3 illustrates one embodiment of a method 300 for processing joint claims on tokens using a smart contract. The steps of FIG. 3 are illustrated from the perspective of the management device 110 performing the method 300. However, some or all of the steps may be performed by other entities or components. In addition, some embodiments may perform the steps in parallel, perform the steps in different orders, or perform different steps.

In the embodiment shown, the method 300 begins with the management device 100 defining 310 a smart contract. The smart contract includes one or more rules. The rules may identify a trigger condition that, if met, causes a subset of the rules to be executed. The management device stores 320 the smart contract on a blockchain in conjunction with a pool of one or more tokens owned by the smart contract and receives 330 a plurality of conflicting claims to the token pool. The management device 100 provides 340 the conflicting claims to the blockchain. One or more non-conflicting claims to the tokens in the pool may also be provided to the blockchain.

The nodes of the blockchain determine whether the trigger condition for the smart contract is met using the one or more rules. If the trigger condition is met, the management device 110 receives 350 an indication that the trigger condition is met. The management device 110 also receives 360 an information indicating how to distribute the tokens in the pool to resolve the conflicting claims. The information is determined using the rules in response to the trigger condition being met. In some embodiments, the indication that the trigger condition is met received 350 by the management device 110 is the information indicating how to distribute the tokens in the pool.

ADDITIONAL CONSIDERATIONS

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing smart contracts with joint claims for a variety of applications. Thus, while particular embodiments and applications have been illustrated and described, it is to be understood that the described subject matter is not limited to the precise construction and components disclosed. The scope of protection should be limited only by any claims that may ultimately issue.

What is claimed is:

1. A computer-implemented method of providing joint claims to tokens, the method comprising:
    defining a smart contract including one or more rules;
    storing the smart contract on a blockchain in conjunction with a pool of one or more tokens owned by the smart contract;
    receiving a plurality of conflicting claims to the pool of one or more tokens;
    providing the plurality of conflicting claims to the blockchain;
    receiving, from the blockchain, an indication that a trigger condition is met, wherein the trigger condition being met was determined using the one or more rules; and
    receiving information, generated using a subset of the one or more rules, indicating a distribution of the one or more tokens to resolve the plurality of conflicting claims, wherein the information was generated responsive to the trigger condition being met.

2. The method of claim 1, wherein the subset of rules to resolve the plurality of conflicting claims is in a manner other than proportionally to stakes of claimants.

3. The method of claim 1, wherein the blockchain records, for each blockchain address, claims equal to total deposits of tokens made into the pool by that blockchain address.

4. The method of claim 1, wherein, responsive to the trigger condition being met, the subset of the rules assigns:
    first, equal amounts of the one or more tokens up to a minimum of a first claim of the plurality of conflicting claims and a maximum deposit insurance amount, and
    second, a proportional amount of the one or more tokens to remaining claims of the plurality of conflicting claims.

5. The method of claim 1, wherein, the plurality of conflicting claims comprise periodic interest payments stored in the blockchain.

6. The method of claim 1, wherein one or more blockchain addresses borrow tokens for a limited time in exchange for interest payments deducted from another smart contract to provide for the periodic interest payments.

7. The method of claim 1, wherein a trigger condition is met when the plurality of conflicting claims to one or more tokens does not reach a threshold value above the actual value of the one or more tokens.

8. The method of claim 1, further comprising periodically transferring portions of the one or more tokens in the pool to a deposit insurance smart contract, wherein the subset of rules include using the portions of the one or more tokens transferred to the deposit insurance smart contract to at least partially mitigate a deficiency between a total value of pool and a total value of the plurality of conflicting claims.

9. The method of claim 1, wherein receiving the indication that the trigger condition is met comprises receiving an indication from an oracle that an off-chain loss event has occurred and the subset of rules resolve claims in favor of one or more users impacted by the off-chain loss event.

10. The method of claim 9, further comprising:
    periodically transferring portions of the one or more tokens in the pool to a reinsurance smart contract; and
    responsive to receiving the indication of the loss event, receiving a reinsurance payment from the reinsurance smart contact for losses over a threshold, wherein the subset of rules include that outstanding claims from the plurality of conflicting claims get a proportional amount of the pool after the reinsurance payment has been taken into account.

11. The method of claim 1, wherein the plurality of conflicting claims include claims for future interest payments and claims for future principal payments.

12. The method of claim 11, wherein the pool further includes an additional smart contract with joint claims.

13. The method of claim 1, wherein the plurality of conflicting claims have a hierarchy of higher priority claims and lower priority claims, wherein the subset of rules include that higher priority claims in the hierarchy are paid in full over lower priority claims.

14. The method of claim 1, wherein the pool further includes a second smart contract, the plurality of conflicting claims include a claim for a borrower and a claim for a lender, and the one or more rules include resolving, responsive to the borrower failing to make a scheduled payment within a specified time, the claim for the lender with priority over the claim for the borrower.

15. The method of claim 1, wherein the blockchain comprises a plurality of nodes, wherein each node receives a definition of the smart contract and transactions that impact the plurality of conflicting claims to pool of one or more tokens, and wherein each node maintains an independent record of the smart contract and plurality of conflicting claims of which it has been informed.

16. The method of claim 1, further comprising:
receiving, from the blockchain and prior to the trigger condition being met, an indication that a second trigger condition is met, wherein the second trigger condition being met was determined using the one or more rules;
resolving, in response to the second trigger condition having been met, a subset of the plurality of conflicting claims,
wherein the distribution of the one or more tokens to resolve the plurality of conflicting claims is subject to the resolution of the subset of the plurality of conflicting claims.

17. A non-transitory computer-readable medium storing instructions that, when executed by a processor, cause the processor to perform operations comprising:
defining one or more rules for the smart contract;
storing the smart contract on a blockchain in conjunction with a pool of one or more tokens owned by the smart contract;
receiving a plurality of conflicting claims to the pool of one or more tokens;
providing the plurality of conflicting claims to the blockchain;
receiving, from the blockchain, an indication that a trigger condition is met, wherein the trigger condition being met was determined using the one or more rules; and
receiving information, generated using a subset of the one or more rules, indicating a distribution of the one or more tokens to resolve the plurality of conflicting claims, wherein the information was generated responsive to the trigger condition being met.

18. A networked computing system suitable for providing smart contracts that use joint claims on tokens, the networked computing system comprising:
a management device configured to:
define and manage rules of smart contracts that use joint claims on tokens;
process transactions and record a plurality of conflicting claims to a blockchain;
store the smart contract on the blockchain in conjunction with a pool of one or more tokens owned by the smart contract;
send information about each claim of the plurality of conflicting claims to a set of the plurality of nodes; and
provide information to a client device to drive a user interface;
the client device comprising a computing device configured to interact with the smart contract; and
the smart contract comprising one or more rules for determining whether a trigger condition is met, wherein the management device is further configured to execute a subset of the one or more rules to resolve the plurality of conflicting claims responsive to the trigger condition being met.

19. The system of claim 18, wherein the plurality of conflicting claims is resolved using the subset of rules in a manner other than proportionally to stakes of claimants.

20. The system of claim 18, wherein, responsive to the trigger condition being met, the subset of the rules assigns:
first, equal amounts of the one or more tokens up to a minimum of a first claim of the plurality of conflicting claims and a maximum deposit insurance amount, and
second, a proportional amount of the one or more tokens to remaining claims of the plurality of conflicting claims.

* * * * *

UNITED STATES PATENT AND TRADEMARK OFFICE
CERTIFICATE OF CORRECTION

| | |
|---|---|
| PATENT NO. | : 11,605,143 B2 |
| APPLICATION NO. | : 17/745343 |
| DATED | : March 14, 2023 |
| INVENTOR(S) | : Paul Burchard |

It is certified that error appears in the above-identified patent and that said Letters Patent is hereby corrected as shown below:

On the Title Page

Item (56), in Column 2, under "Other Publications", Line 3, delete "p." and insert -- pp. --, therefor.

In the Claims

In Column 10, in Claim 10, Line 63, delete "smart contact" and insert -- smart contract --, therefor.

Signed and Sealed this
Fifteenth Day of August, 2023

Katherine Kelly Vidal
*Director of the United States Patent and Trademark Office*